Figure 1:
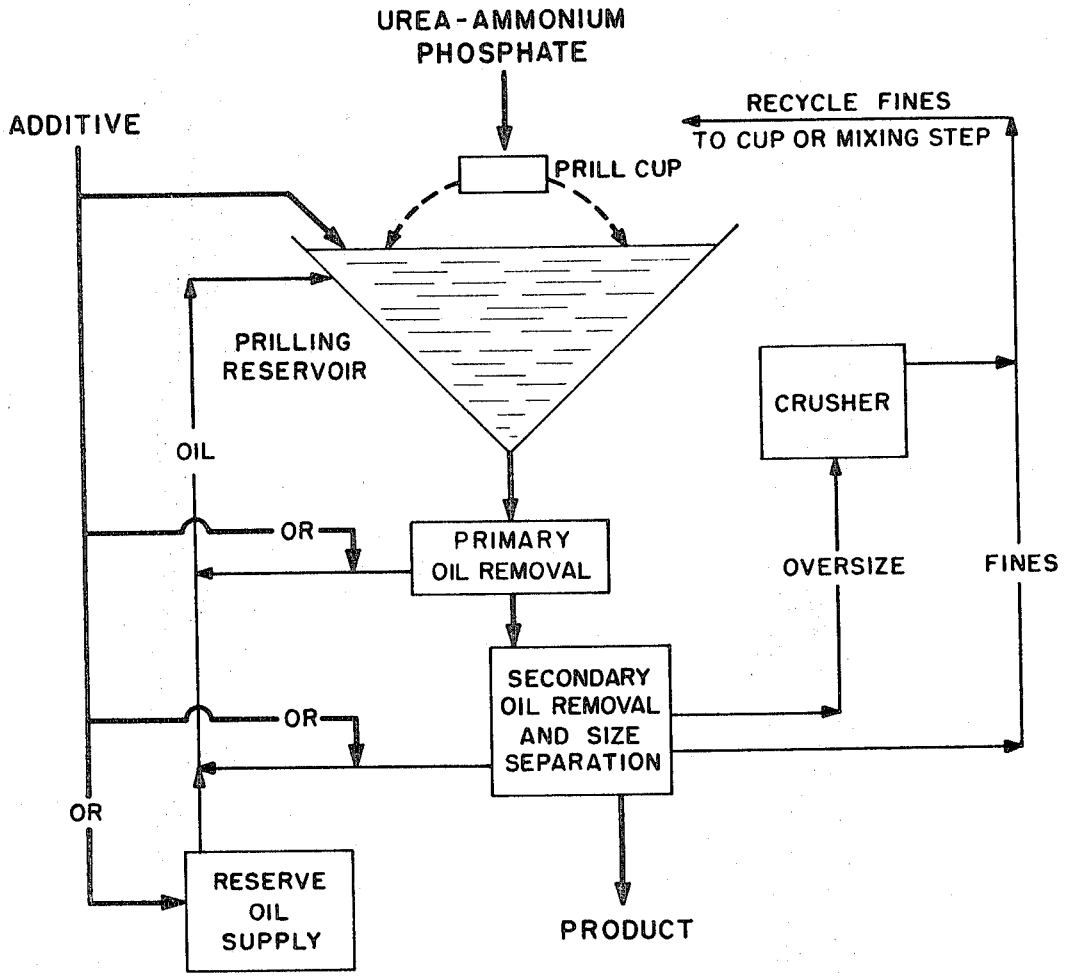
Figure 2:
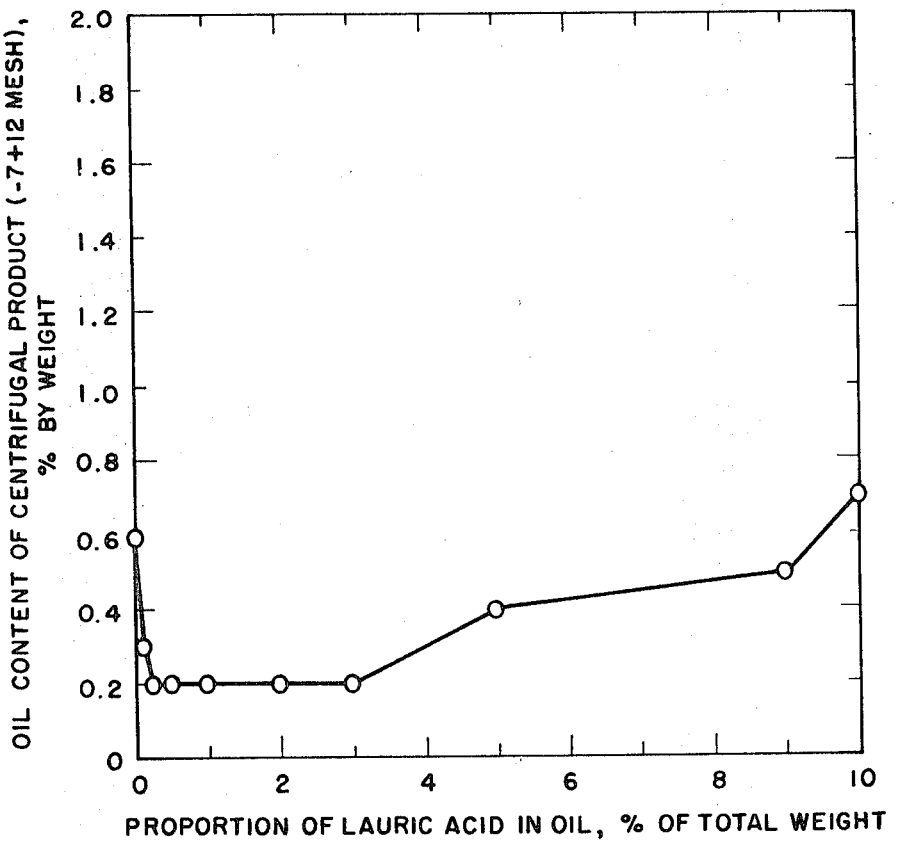
Figure 3:
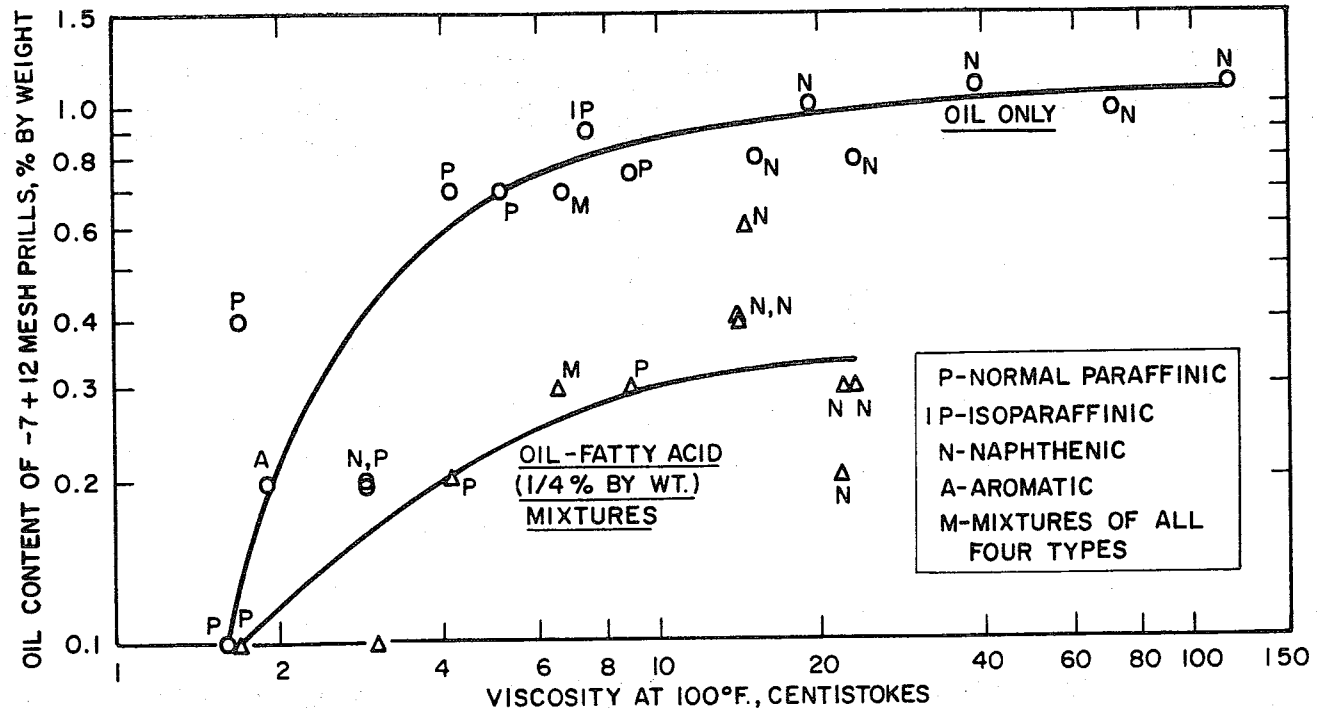

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1364

T889,012
PRODUCTION OF OIL-PRILLED UREA-AMMONIUM POLYPHOSPHATE FERTILIZERS
John E. Jordan, Sheffield, Ala., assignor to Tennessee Valley Authority
Filed Aug. 28, 1970, Ser. No. 67,878
Int. Cl. C05b *19/00;* C05c *9/00*
U.S. Cl. 71—29
3 Sheets Drawing, 28 Pages Specification

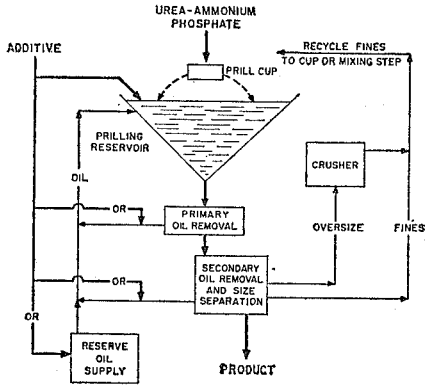

METHODS OF INCORPORATING ADDITIVES IN OIL PRILLING PROCESS FOR PRODUCTION OF UREA-AMMONIUM PHOSPHATES

Process for oil prilling urea and/or urea-ammonium phosphates. Improvements include increased oil removal from the products by (1) including small amounts of additives in the oil prilling bath, (2) selecting a prilling bath oil having a low viscosity, and (3) washing the oil-prilled products during the oil removal process. Methods result in increased oil recovery and in products of enhanced value because of the lowered oil content. The enhanced values include improvement in storage properties and quality of liquid fertilizer made from these products. Additives include certain fatty acids. Washing media include methyl alcohol and phosphoric acid. Prilling bath oil is selected from naphthenic and/or isoparaffinic based hydrocarbons, for prevention of urea adduct formation in the production of liquid fertilizer.

METHODS OF INCORPORATING ADDITIVES IN OIL PRILLING PROCESS FOR PRODUCTION OF UREA-AMMONIUM PHOSPHATES

John E. Jordan INVENTOR.

BY Robert A. Petrusek
Agt

EFFECT OF LAURIC ACID ADDITION ON OIL CONTENT OF 36-18-0 PRODUCT PRILLED IN MINERAL SEAL OIL

John E. Jordan INVENTOR.
BY Robert A. Petrunak
Agt.

UREA-AMMONIUM PHOSPHATES (50% OF $P_2O_5$ AS POLYPHOSPHATES):
EFFECT OF OIL VISCOSITY AND FATTY ACID ADDITION ON
OIL CONTENT OF 36-18-0 GRADE PRODUCTS

John E. Jordan INVENTOR.
BY Robert A. Petrusek
Agt